(12) United States Patent
Endo et al.

(10) Patent No.: US 7,483,180 B2
(45) Date of Patent: Jan. 27, 2009

(54) SCANNER UNIT AND A HYBRID APPARATUS USING IT

(75) Inventors: Katsuyuki Endo, Matsumoto (JP); Hideki Furihata, Okaya (JP)

(73) Assignee: Seiko Epson Corporation, Tokyo (JP)

(*) Notice: Subject to any disclaimer, the term of this patent is extended or adjusted under 35 U.S.C. 154(b) by 989 days.

(21) Appl. No.: 10/300,201

(22) Filed: Nov. 19, 2002

(65) Prior Publication Data

US 2003/0218783 A1 Nov. 27, 2003

(30) Foreign Application Priority Data

May 21, 2002 (JP) ............................. 2002-146431

(51) Int. Cl.
*H04N 1/04* (2006.01)
(52) U.S. Cl. ....................... 358/474; 358/475
(58) Field of Classification Search ................ 235/449, 235/439; 358/474–486; 347/163; 271/3.14, 271/243, 244, 245
See application file for complete search history.

(56) References Cited

U.S. PATENT DOCUMENTS

| | | | | |
|---|---|---|---|---|
| 5,634,551 A | * | 6/1997 | Francioni et al. ......... | 198/460.1 |
| 5,965,862 A | * | 10/1999 | Momose ..................... | 235/449 |
| 6,832,723 B2 | * | 12/2004 | Murata et al. .............. | 235/439 |
| 2004/0193641 A1 | * | 9/2004 | Lin ............................ | 707/104.1 |
| 2005/0127182 A1 | * | 6/2005 | Nagata et al. ............. | 235/454 |
| 2006/0115312 A1 | * | 6/2006 | Furihata et al. ........... | 400/149 |
| 2007/0291328 A1 | * | 12/2007 | Furihata et al. ........... | 358/498 |

FOREIGN PATENT DOCUMENTS

| | | | |
|---|---|---|---|
| JP | 63-303561 | | 12/1988 |
| JP | 404208764 | * | 7/1992 |
| JP | 6-41269 | | 5/1994 |
| JP | 7-242044 | | 9/1995 |
| JP | 10-200673 | | 7/1998 |
| JP | 11-164086 | | 6/1999 |
| JP | 02000194083 | * | 7/2000 |
| JP | 02000231283 | * | 8/2000 |
| JP | 2000-255828 | | 9/2000 |

\* cited by examiner

*Primary Examiner*—Jerome Grant, II (57) ABSTRACT

Problem

To provide technology for preventing a drop in image scanning quality due to penetration of external light and contact with an ink ribbon.

Means of Resolution

A scanner unit 20 according to the present invention has a scanner head 21 and a support member 22 for supporting this scanner head 21. The scanner head 21 has a scanning surface 25 for scanning with the paper supported pressed by scanner feed roller 30. A stepped support part 27 having support surfaces 27a to 27d positioned to the scanner feed roller 30 side of the scanning surface 25 is disposed to the edge of the scanning surface 25.

13 Claims, 6 Drawing Sheets

SCANNER UNIT AND A HYBRID APPARATUS USING IT

DETAILED DESCRIPTION OF THE INVENTION

1. Technical Field of the Invention

The present invention relates to a scanner for reading information printed to a check, for example, and to a hybrid apparatus using the same.

2. Prior Art

Check processors having, for example, a print head, image scanner, and magnetic head, have been proposed in recent years as a type of hybrid processing device combining a processing device such as an image scanner with a printer.

These check processors are convenient because they can immediately process payments by check on-line by printing necessary information on the check, read the check after it has been printed, transmit a scanned image of the check to a clearing house as necessary, and communicate transaction content as electronic data.

Problem to be Solved by the Invention

A problem with these check processors is that they may be installed where they are subject to interference from external light, such as beside a window, under lighting, or even outdoors, thus allowing extraneous external light to enter between the scanner head and paper and thereby degrade image scanning quality.

Furthermore, the print head may be located beside the scanner head in a device having a printer that uses an ink ribbon cassette due to the construction of the device. This can result in the ink ribbon touching the scanner head when the ink ribbon cassette is replaced, thereby soiling the scanner head and degrading image scanning quality.

The present invention is directed to solving these problems of the prior art, and an object of the invention is to provide technology for preventing a drop in image scanning quality due to the penetration of external light or ink ribbon contact.

Means for Solving the Problem

The present invention directed to achieving the above object is a scanner unit characterized by comprising a pressure member, a scanner head having a scanning surface for scanning a paper pressed by the pressure member, and a stepped support part disposed to an edge part of the scanning surface of the scanner head and having a support surface positioned to the pressure member side of the scanning surface.

It is also effective in this case for the stepped support part to be disposed at an end in the main scanning direction of the scanner head. It is also effective for the stepped support part to be disposed at both ends in the main scanning direction of the scanner head. It is yet further effective for the stepped support part to be disposed at an end in a sub scanning direction of the scanner head. It is yet further effective for the stepped support part to be disposed at both ends in the sub scanning direction of the scanner head. It is yet further effective to have a light shield part formed so as to cover an edge part of the scanning surface of the scanner head. It is yet further effective for the stepped support part to be disposed to a support member for supporting the scanner head. In addition, it is also effective to have a guide part for guiding an ink ribbon disposed near the stepped support part.

The present invention is also a hybrid apparatus having a transportation path for transporting paper, a print head for printing to paper transported along the transportation path, and a scanner unit for scanning information on paper transported along the transportation path, characterized by the scanner unit comprising a pressure member, a scanner head having a scanning surface for scanning a paper pressed by the pressure member, and a stepped support part disposed to an edge part of the scanning surface of the scanner head and having a support surface positioned to the pressure member side of the scanning surface.

By disposing a stepped support part, which has a support surface positioned to the pressure member side of the scanning surface, to the edge part of the scanning surface of the scanner head (at both ends in the main scanning direction and both ends in the sub scanning direction for example), paper at the edge part of the scanning surface of the scanner head rides over and bends at the support surface of the stepped support part when the paper is pressed by the pressure member to the scanning surface of the scanner for scanning, and the paper is pressed against the support surface of the stepped support part by the resilience (stiffness) of the paper.

Because a gap thus does not occur with the present invention between the paper and scanning surface of the scanner head during scanning, outside light is prevented from entering and a drop in image scanning quality is prevented.

Furthermore, because the support surfaces of the stepped support part, which are formed so as to be higher than the scanning surface of the scanner head, prevent the ink ribbon from touching the scanning surface of the scanner head when replacing the ribbon cassette, the scanning surface is not dirtied and a drop in image scanning quality can be prevented.

Furthermore, if a light shield part formed so as to cover the edge part of the scanning surface of the scanner head is also disposed in the present invention, the entry of outside light can be prevented and a drop in image scanning quality can be prevented even more reliably.

Furthermore, by disposing the stepped support part to the support member that holds the scanner head in the present invention, a simpler configuration can be achieved and the parts count can be reduced.

Moreover, if guides for guiding the ink ribbon are disposed near the support surface of the stepped support part in the present invention, contact between the ink ribbon and the scanning surface of the scanner head can be prevented even more reliably and the ribbon cassette can be replaced smoothly.

EMBODIMENT OF THE INVENTION

A scanner unit according to the present invention and a hybrid apparatus using the same are described below with reference to the accompanying figures.

Figure 1:
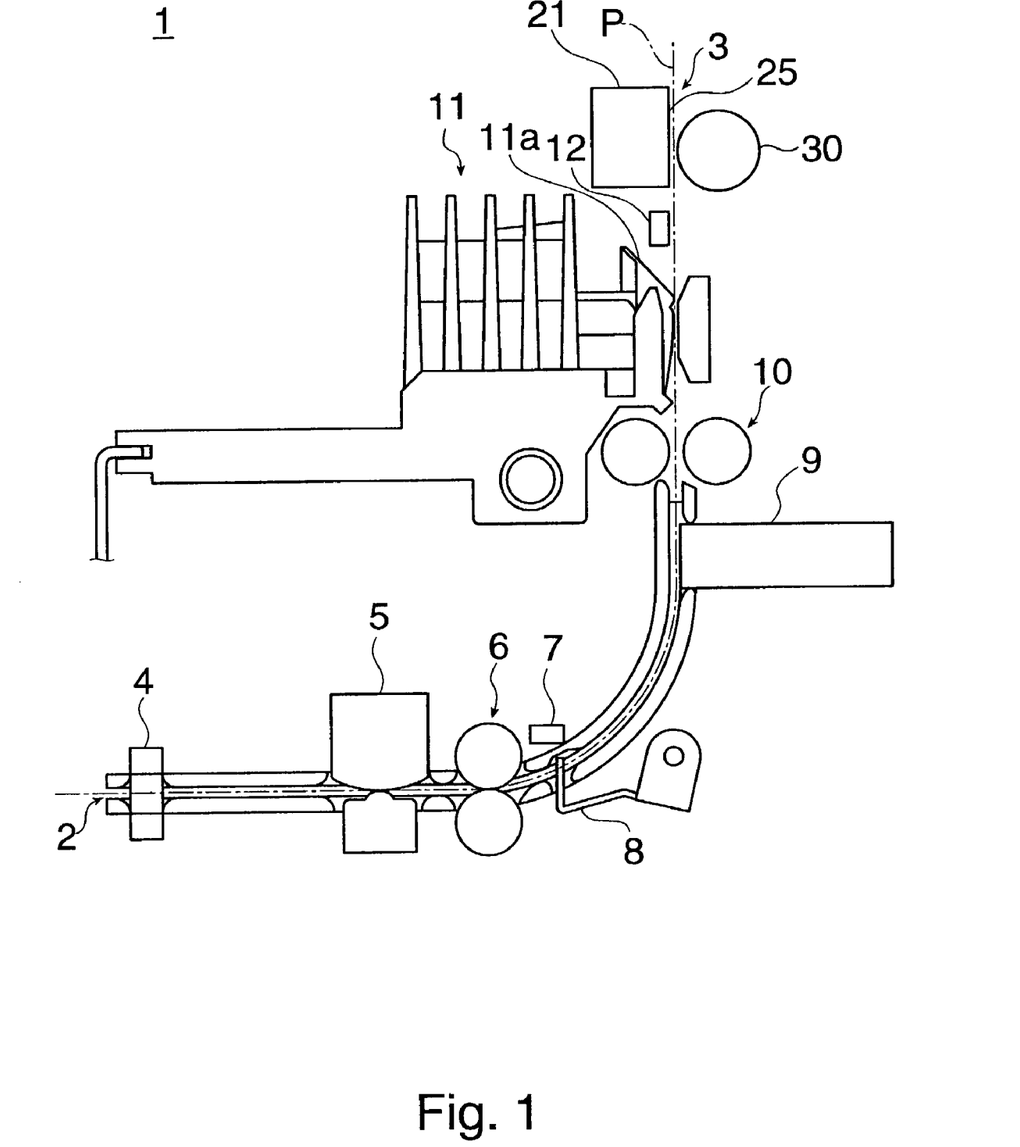
FIG. 1 is a side schematic view showing a preferred embodiment of a hybrid apparatus according to the present invention.

FIG. 1 is a side schematic view showing a hybrid apparatus according to a preferred embodiment of the invention.

As shown in FIG. 1 a hybrid apparatus 1 according to this embodiment of the invention has a transportation path P for carrying a form S (see FIG. 5) from the insertion opening 2 to the exit 3 internally.

As seen from the side the transportation path P curves in an L shape with the insertion opening 2 side horizontally oriented and the exit 3 side vertically oriented.

Disposed along the transportation path P in order from the insertion opening 2 side are a trailing edge detector 4, MICR head 5, first feed roller pair 6, leading edge detector 7, form positioning stop 8, endorsement printing head 9, second feed roller pair 10, face printing head 11, form ejection detector 12, and a scanner head 21 and scanner feed roller (pressure member) 30.

Figure 2:
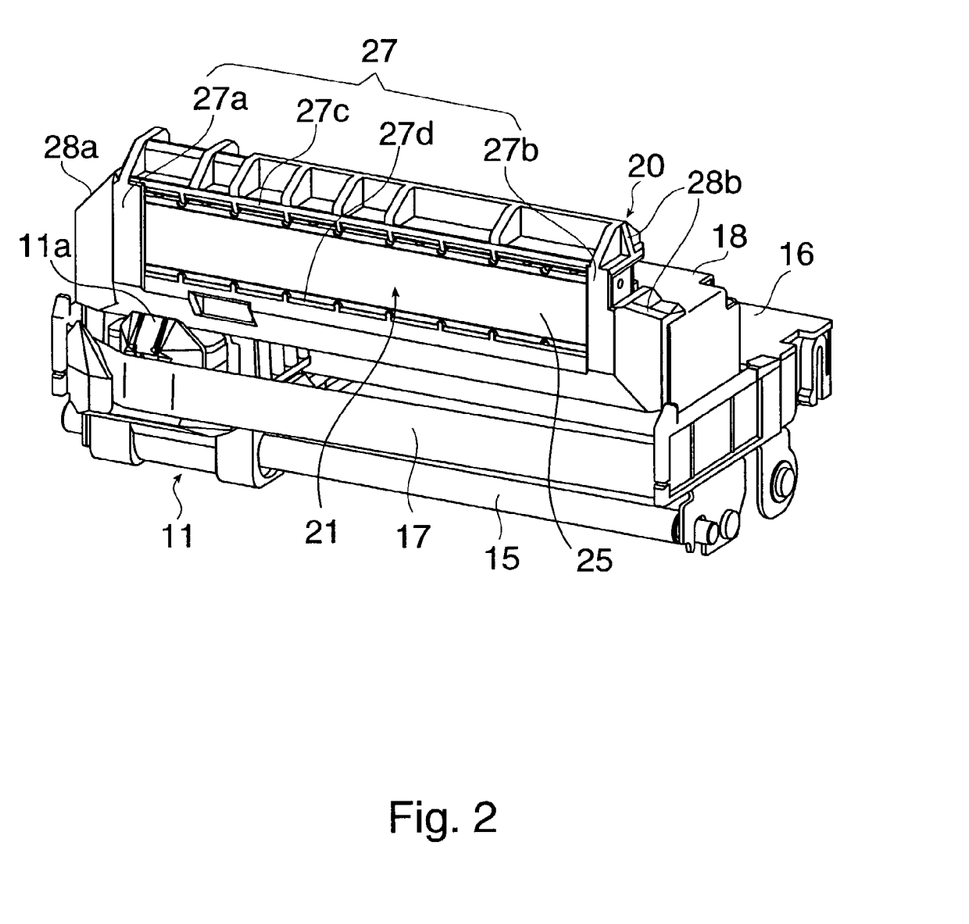
FIG. 2 is an oblique view showing the external appearance of the face printing head and scanner unit in the same embodiment of the invention.
Figure 3:
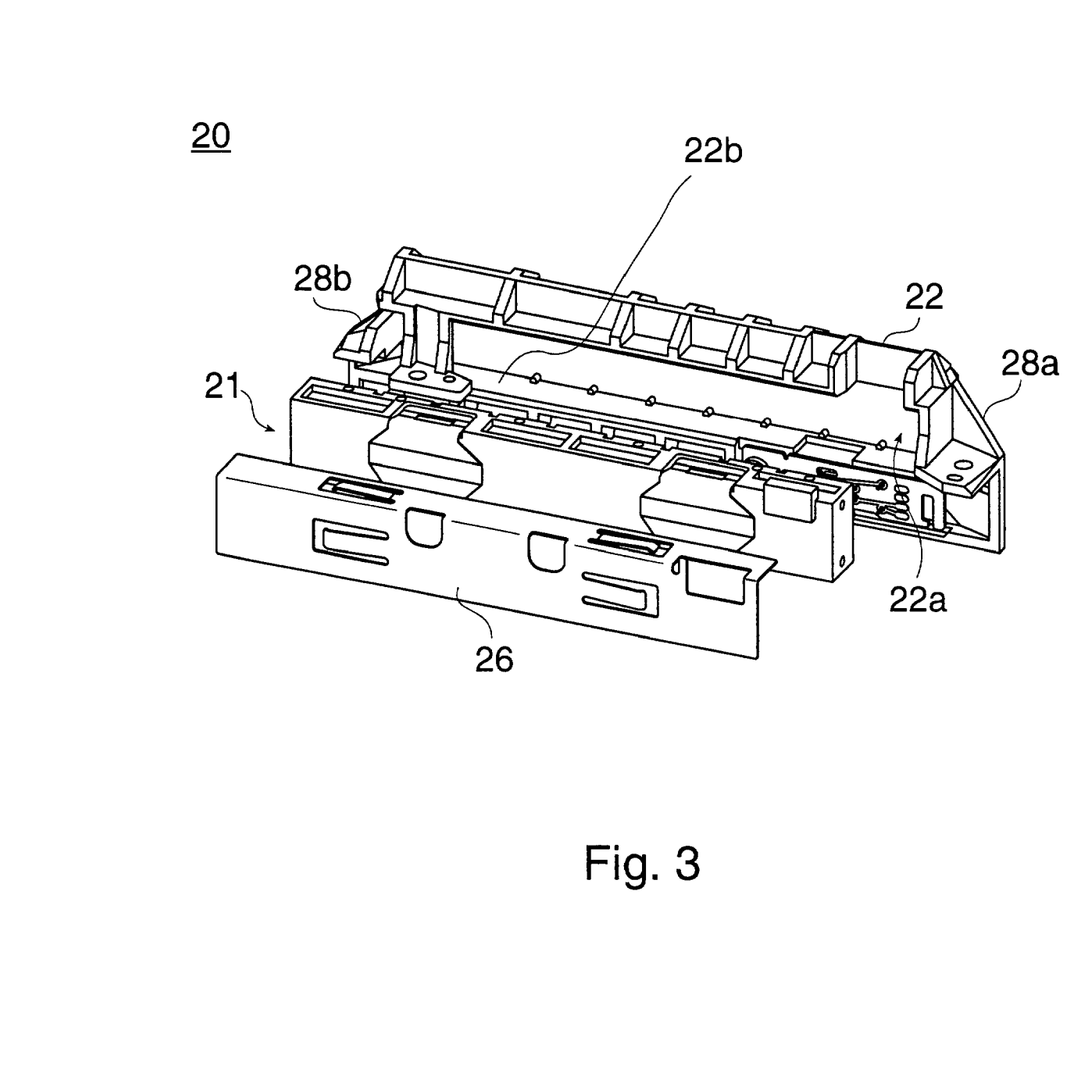
FIG. 3 is an exploded oblique view showing the appearance of the same scanner unit.

FIG. 2 is an oblique view showing the external appearance of the face printing head and scanner unit in the present embodiment, and FIG. 3 is an oblique exploded view showing the external appearance of the scanner unit.

Figure 4:
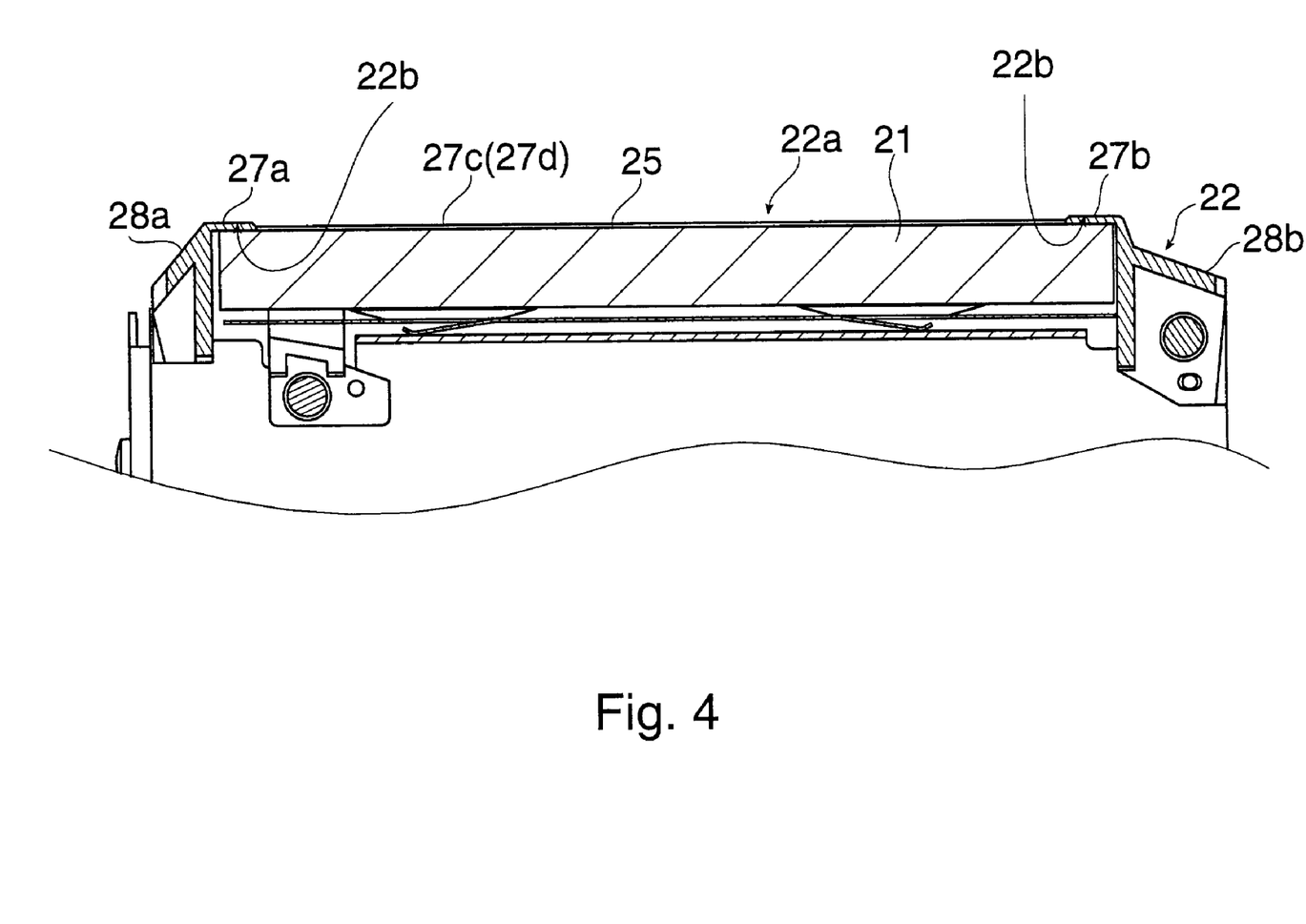
FIG. 4 is a sectional view showing the major parts of the same scanner unit.
Figure 5:
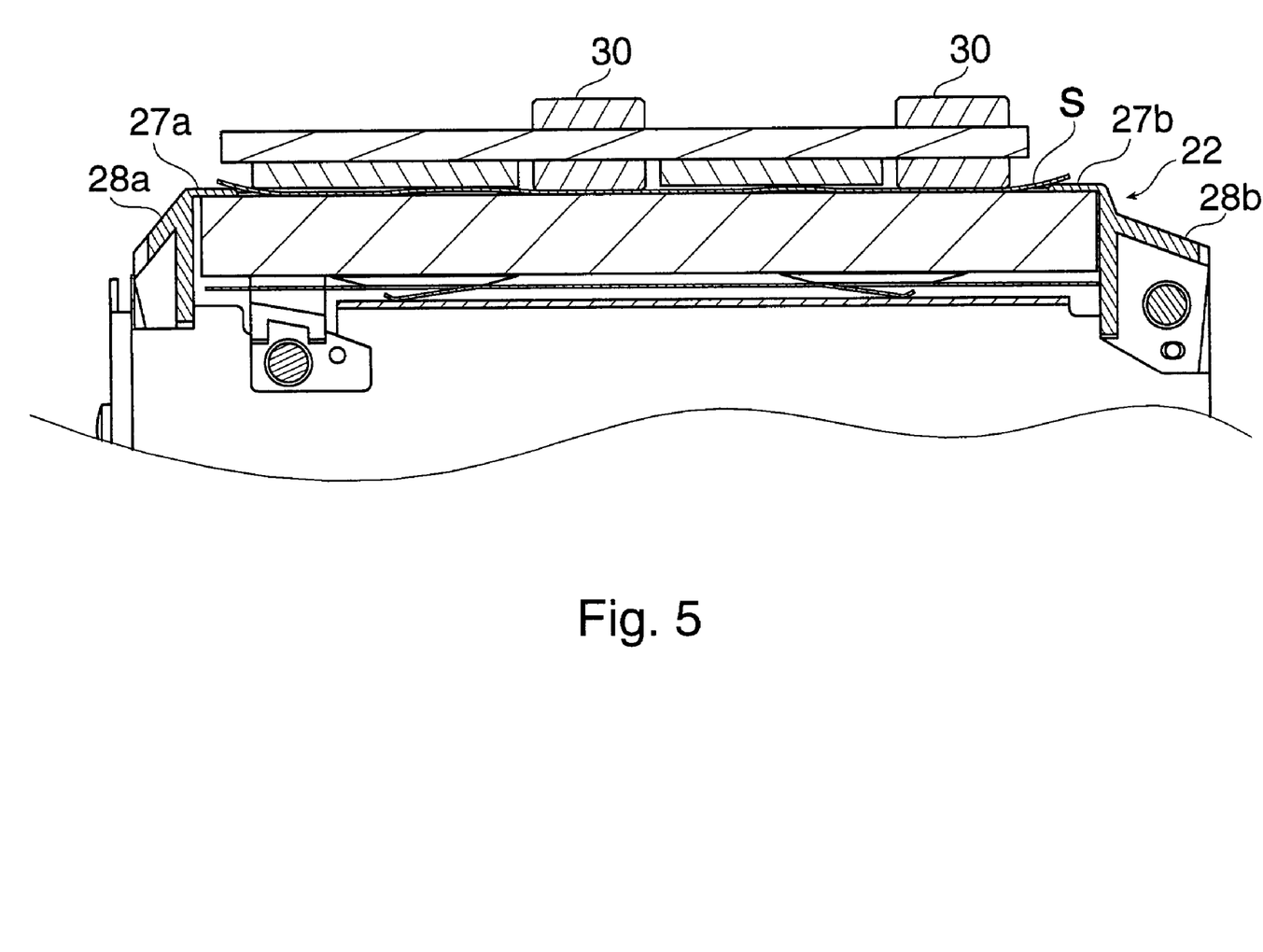
FIG. 5 is a sectional view showing the major parts of the same scanner unit while scanning.
Figure 6:
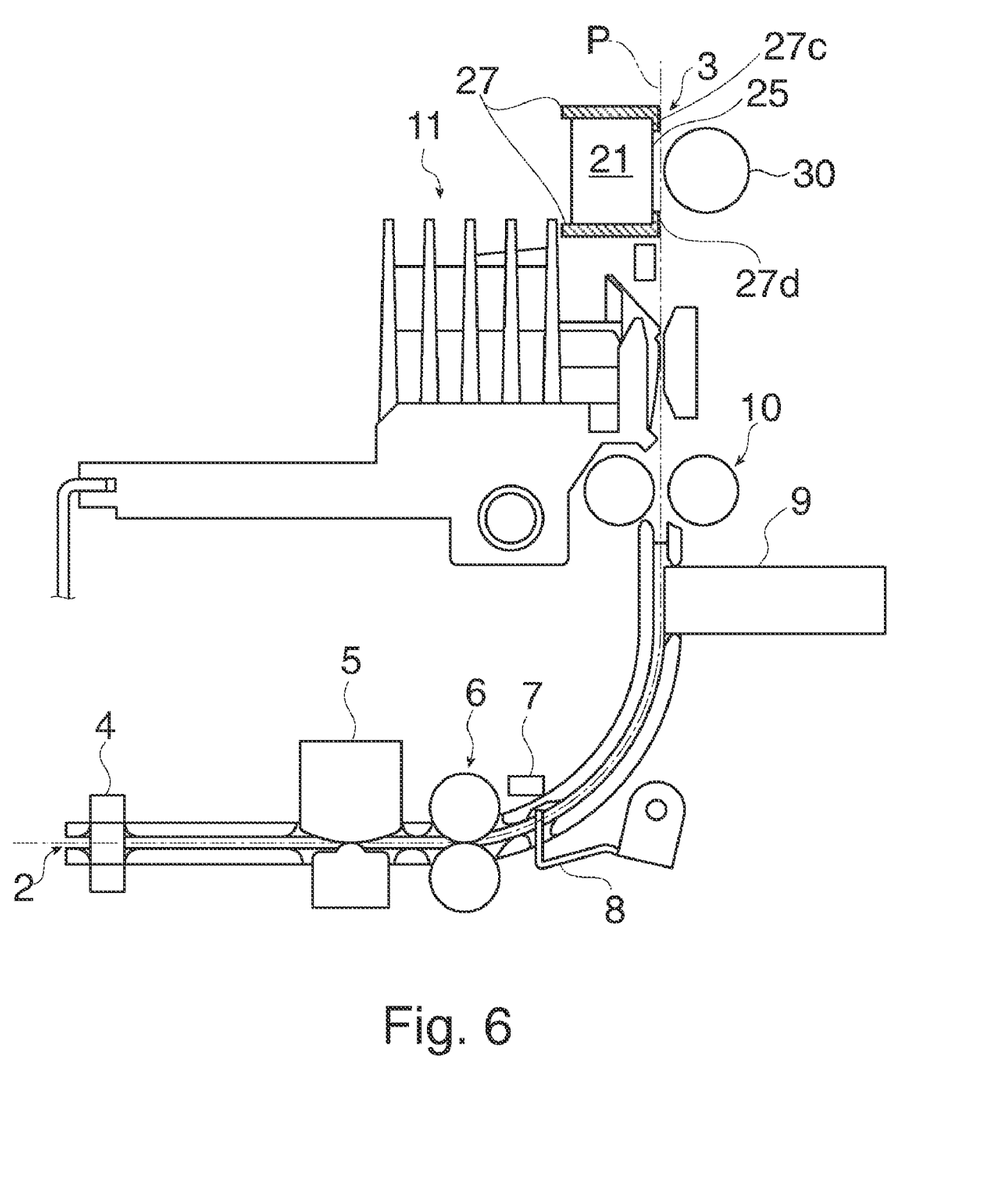
FIG. 6 is a side schematic view showing a preferred embodiment of a hybrid apparatus according to the present invention.

FIG. 4 is a sectional view showing the major parts of the scanner unit, and FIG. 5 is a sectional view showing the major parts of the scanner unit while scanning.

The face printing head 11 of this embodiment prints, for example, the payee, date, amount, and other information to the face of the check or other form S.

As shown in FIG. 2 this face printing head 11 has a serial wire dot head 11a supported on a carriage shaft 15 for transferring ink from an ink ribbon 17 delivered from a ribbon cartridge 16 to the form S while travelling widthwise to the form S.

A scanner unit 20 is attached to the carriage cover 18 to which the ribbon cartridge 16 is mounted in this embodiment.

As shown in FIG. 2, the scanner unit 20 is disposed above the face printing head 11.

The scanner unit 20 in this preferred embodiment has a scanner head 21 for scanning the form S, and a support member 22 for holding this scanner head 21.

The scanner head 21 is a contact image sensor (CIS: Contact Image Sensor) with lines of light-emitting elements and photodetectors disposed inside the scanner head 21 widthwise to the form S. In this preferred embodiment the widthwise direction of the form S is the main scanning direction of the scanner head 21, and the transportation path P is the sub scanning direction.

This scanner head 21 has a flat glass or other transparent scanning surface 25, and this scanning surface 25 is disposed parallel to the transportation path P. In this preferred embodiment the scanning surface 25 is disposed facing the vertical direction.

As shown in FIG. 1 the scanner feed roller 30 is disposed opposing the scanning surface 25 with the transportation path P therebetween, and is disposed so as to press a form S transported through the transportation path P against the scanning surface 25.

The support member 22 is formed from resin, for example, as a single piece, and has a storage opening 22a of substantially the same size as the scanner head 21 disposed in the support member 22 as shown in FIG. 3.

The scanner unit 20 of this embodiment has the scanner head 21 inserted to and held in the storage opening 22a of the support member 22 by means of a metal pressure plate 26, for example, pressing the top part and back of the scanner head 21 to the inside wall 22b of the storage opening 22a in the support member 22.

It should be noted that the scanning surface 25 is exposed when the scanner head 21 is held in the support member 22 as shown in FIG. 2.

In this embodiment of the invention the inside wall 22b of the storage opening 22a in the support member 22 is formed so that it substantially contacts the scanner 24, covering the edge part of the scanning surface 25 and functioning as a light shield.

A stepped support part 27 having support surfaces 27a to 27d positioned on the scanner feed roller 30 side of the scanning surface 25 is disposed at the front side of the support member 22 around the perimeter of the storage opening 22a (both edges in the main scanning direction and both edges in the sub scanning direction of the scanner head 21), that is, at the part corresponding to the perimeter of the scanning surface 25.

Each of the support surfaces 27a to 27d of the stepped support part 27 are formed as flat surfaces parallel to the transportation path P.

The support surfaces 27a, 27b formed to the storage opening 22a of the support member 22 at both ends in the main scanning direction of the scanner head 21 are approximately 1 mm higher than the scanning surface 25, that is, are positioned away from the scanning surface 25 to the scanner feed roller 30 side. The distance between the support surfaces 27a, 27b of the support member 22 is slightly less than the width of the scanned form S.

The support surfaces 27c, 27d formed to the storage opening 22a of the support member 22 at both ends in the sub scanning direction of the scanner head 21 are approximately 0.5 mm higher than the scanning surface 25, that is, are positioned to the scanner feed roller 30 side away from the scanning surface 25.

Guides 28a, 28b for guiding the ink ribbon 17 are disposed near the support surfaces 27a, 27b of the support member at both ends in the main scanning direction of the scanner head 21. These guides 28a, 28b are formed with a taper inclined in the direction of the ends of the ribbon cartridge 16.

When a form S is pressed to the scanning surface 25 by the scanner feed roller 30 while scanning in the preferred embodiment described above, the form S passing over the edges of the storage opening 22a of the support member 22 flexes as it rides over each of the support surfaces 27a to 27d of the stepped support part 27, and the form S is pressed against the support surfaces 27a to 27d of the stepped support part 27 by the resilience (stiffness) of the form S.

Because a gap thus does not occur with this embodiment of the invention between the form S and the scanning surface 25 during scanning, external light can be prevented from entering and a drop in image scanning quality can be prevented.

Furthermore, because the ink ribbon 17 is prevented from touching the scanning surface 25 by the support surfaces 27a to 27d of the stepped support part 27, which are formed to be higher than the scanning surface 25, when the ribbon cartridge 16 is replaced with the present invention, the scanning surface 25 is not dirtied and a drop in image scanning quality can be prevented.

Moreover, because guides 28a, 28b for guiding the ink ribbon 17 are formed near the support surfaces 27a, 27b of the stepped support part 27, the ink ribbon 17 can be more reliably prevented from touching the scanning surface 25, and the ribbon cartridge 16 can be replaced more smoothly.

It should be noted that the present invention shall not be limited to the embodiment described above, and can be varied in many ways.

For example, a stepped support part is disposed around the entire perimeter of the scanning surface of the scanner head in the embodiment described above, but the invention shall not be so limited as a stepped support part could be disposed to only part (such as the ends in the main scanning direction of the scanner head) of the edge around the scanning surface of the scanner head.

Furthermore, the height and shape of the support surfaces of the stepped support part can be changed appropriately according to the type of scanner head and configuration of the apparatus.

Yet further, a stepped support part is disposed to the support member of the scanner head in the above-described preferred embodiment, but the present invention shall not be so limited as the stepped support part alone could be separately provided. It is, however, preferably disposed to the support member in order to reduce the number of parts.

The present invention is also not limited to hybrid apparatuses for scanning and printing checks, for example, and can be applied to various devices for scanning and printing.

The present invention is, however, most effective when applied to a hybrid apparatus such as described in the above embodiment.

EFFECTS OF THE INVENTION

As a result of disposing a stepped support part, which has support surfaces positioned to the pressure member side of the scanning surface, around the edge of the scanning surface of the scanner head, a gap does not occur between the paper and scanning surface of the scanner head while scanning, and the present invention can therefore obstruct the entry of external light and prevent a drop in image scanning quality.

Furthermore, because contact between the ink ribbon and scanning surface of the scanner head when replacing the ribbon cassette is prevented by the support surfaces of the stepped support part, which is formed so that it is higher the scanning surface of the scanner head, the scanning surface is not dirtied and a drop in image scanning quality can be prevented.

KEY TO THE FIGURES 1 hybrid apparatus
11 face printing head
11a wire dot head
16 ribbon cartridge
17 ink ribbon
20 scanner unit
21 scanner head
22 support member
22a storage opening
22b inside wall (light shield part)
25 scanner scanning surface (scanning surface)
27 stepped support part
27a, 27b, 27c, 27d support surfaces
28a, 28b guides
30 scanner feed roller (pressure member)

What is claimed is:

1. A scanner unit, comprising:
a pressing member,
a scanner head having a scanning surface for optically scanning a printed medium pressed against the scanning surface by the pressing member, wherein the scanner head includes a contact image sensor, and
a stepped support part disposed relative to an edge portion of the scanning surface, the stepped support part having a support surface substantially parallel to the scanning surface and positioned toward the pressing member side of a printed medium transportation path extending between the scanning surface and the pressing member, wherein the printed medium exits the printed medium transportation path near the scanner head.

2. The scanner unit as described in claim 1, further comprising a light shield formed so as to cover an edge area of the scanning surface.

3. The scanner unit as described in claim 1, wherein the stepped support part is disposed on a support member that supports the scanner head.

4. The scanner unit as described in claim 1, wherein a guide for guiding an ink ribbon is disposed near the stepped support part.

5. The scanner unit as described in claim 1, wherein the stepped support part is disposed such that external light is prevented from entering the scanning surface while the printed medium is pressed against the scanning surface and the stepped support part.

6. The scanner unit as described in claim 1, wherein the support surface includes a first support surface disposed along a first edge of the scanning surface, the first edge defining a main scanning direction along the scanning surface.

7. The scanner unit as described in claim 6, wherein the support surface includes a second support surface disposed along a second edge of the scanning surface, the second edge being substantially parallel to the first edge.

8. The scanner unit as described in claim 7, wherein the support surface includes a third support surface disposed along a third edge of the scanning surface, the third edge defining a sub scanning direction along the scanning surface.

9. A hybrid apparatus, comprising:
a transportation path for transporting a printed medium,
a print head for printing to a printed medium transported along the transportation path, and
a scanner unit for optically scanning information on a printed medium transported along the transportation path,
wherein the scanner unit comprises a pressing member, a scanner head having a scanning surface for optically scanning a printed medium pressed against the scanning surface by the pressing member, wherein the scanning head includes a contact image sensor, and a stepped support part having a support surface substantially parallel to the scanning surface and positioned toward the pressing member side of the transportation path.

10. The hybrid apparatus as described in claim 9, wherein the scanner unit is positioned above the print head.

11. The scanner unit as described in claim 9, wherein the stepped support part is disposed such that external light is prevented from entering the scanning surface while the printed medium is pressed against the scanning surface and the stepped support part.

12. A scanner unit, comprising:
a pressing member,
a scanner head having a scanning surface for optically scanning a printed medium pressed against the scanning surface by the pressing member, wherein the pressing member is positioned on a pressing member side of a printed medium transportation path and the scanner head is positioned on a scanner side of the printed medium transportation path opposing the printed medium side, and a stepped support part positioned on the scanner side of the path along which the printed medium travels is disposed relative to an edge portion of the scanning surface, wherein the stepped support part has a support surface substantially parallel to the scanning surface which extends toward the pressing member side of the printed medium transportation path away from the scanning surface, and the stepped support part is disposed such that external light is substantially prevented from entering the scanning surface while the printed medium is pressed against the scanning surface and the stepped support part.

13. The scanner unit as described in claim 12, wherein the scanner head includes a contact image sensor.

* * * * *